United States Patent [19]

Heggs et al.

[11] Patent Number: 5,281,668
[45] Date of Patent: Jan. 25, 1994

[54] THERMOPLASTIC RESIN COMPOSITION

[75] Inventors: Richard Heggs; Carol Geary, both of Dublin, Ohio

[73] Assignee: Sumitomo Bakelite Company Limited, Tokyo, Japan

[21] Appl. No.: 735,607

[22] Filed: Jul. 25, 1991

[51] Int. Cl.⁵ .................. C08L 23/00; C08L 67/02; C08L 77/00
[52] U.S. Cl. .................. 525/166; 525/176; 525/177; 525/179; 525/183; 525/184
[58] Field of Search ............... 525/166, 177, 179, 184

[56] References Cited

U.S. PATENT DOCUMENTS

| | | | |
|---|---|---|---|
| 4,619,971 | 10/1986 | Yates | 525/166 |
| 4,870,110 | 9/1989 | Mehra | 525/166 |
| 4,929,656 | 5/1990 | Golder | 525/177 |

Primary Examiner—Patricia A. Short
Attorney, Agent, or Firm—Browdy and Neimark

[57] ABSTRACT

A thermoplastic resin composition comprising
100 parts by weight of a resin mixture comprising
 (A) 5-95% by weight of polyolefin and
 (B) 95-5% by weight of polyester and/or polyamide, and
 (C) 1-20 parts by weight of chlorinated polyethylene incorporated into the resin mixture.

4 Claims, No Drawings

THERMOPLASTIC RESIN COMPOSITION

FIELD OF THE INVENTION

The present invention relates to a novel thermoplastic resin composition which can be used as molded articles, sheets, films, etc. through injection molding, extrusion, and the like. In more particular, it relates to a composition wherein the compatibility of polyolefin with polyester and/or polyamide has been markedly improved.

RELATED ART STATEMENT

Polyolefins are excellent in processability, toughness, water resistance, organic solvent resistance, chemical resistance, etc., have a low specific gravity and are low in price, so that they have been in wide use for various molded articles, films, sheets, etc. However, polyolefins are not very good in heat resistance and rigidity, and hence further improvement of these properties has been desired to open up new avenues of use therefor. On the other hand, polyesters have been used in wide fields including electric and electronic instrument parts, automobile parts, etc. by virtue of their excellent characteristic properties. However, since polyesters are rather poor in impact resistance, particularly notched impact resistance, a number of methods have been proposed to improve this property.

For example, a method is well known which comprises blending into polyester a modified ethylene copolymer obtained by graft-polymerizing an α,β-unsaturated dicarboxylic acid or the derivative thereof to a copolymer of ethylene and an α-olefin of 3 or more carbon atoms. In this method, however, though the resulting blend is somewhat improved in impact resistance, it is still unsatisfactory for uses where the requirement for impact resistance is stringent; further it gives formed articles of poor appearance, pearly luster being developed on the surface of the articles.

Also, attempts have been made to combine polyethylene and polyamide, thereby to produce a thermoplastic resin composition provided with characteristic properties of both resins. These attempts, however, have yielded only compositions which are poor in compatibility and are apt to undergo non-uniform phase separation when extruded into films, sheets, bottles, etc., giving a markedly deteriorated appearance and unsatisfactory transparency.

OBJECT OF THE INVENTION

The object of the present invention is to provide a novel thermoplastic resin composition which has excellently balanced properties including processability, rigidity, heat resistance, impact resistance, oil resistance, chemical resistance and water resistance and gives excellent appearance and transparency when processed into films, sheets, etc., by incorporating chlorinated polyethylene into polyolefin and polyester and/or polyamide thereby to disperse the component resins in a microscopically uniform manner to have particle diameters of 1 μm or less.

SUMMARY OF THE INVENTION

According to the present invention, there is provided a thermoplastic resin composition comprising
100 parts by weight of a resin mixture comprising
(A) 5-95% by weight of polyolefin and
(B) 95-5% by weight of polyester and/or polyamide, and
(C) 1-20 parts by weight of chlorinated polyethylene incorporated into the resin mixture.

DETAILED DESCRIPTION OF THE INVENTION

The polyolefins (A) used in the present invention may be homopolymers of α-olefins such as ethylene, propylene, butene-1, pentene-1, hexene-1, 3-methylbutene-1, octene-1, etc.; copolymers of these α-olefins in the form of random or block copolymers; random, block or graft copolymers of these α-olefins as the major portion component with other unsaturated monomers; and oxidized, halogenated or sulfonated products of these polymers. The polyolefins should exhibit crystallinity at least partially.

Examples of said other unsaturated monomers include unsaturated organic acids or the derivatives thereof, such as acrylic acid, methacrylic acid, maleic acid, itaconic acid, methyl acrylate, ethyl acrylate, methyl methacrylate, maleic anhydride, arylmaleic imide, alkylmaleic imide, etc.; vinyl esters such as vinyl acetate, vinyl butyrate, etc.; aromatic vinyl compounds such as styrene, methylstyrene, etc.; vinylsilanes such as vinyltrimethoxysilane, γ-methacryloyloxypropyltrimethoxysilane, etc.; and non-conjugated dienes such as dicyclopentadiene, 4-ethylidene-2-norbornene, etc. In the case of copolymerization, the α-olefin and the other unsaturated monomer may be used in combination of not only two, but also a larger number, thereof.

The polyester (B) used in the present invention is a polyester having an aromatic ring as a polymer chain unit. It is usually a polymer or a copolymer obtained by condensation of an aromatic dicarboxylic acid (or its ester-forming derivative) and a diol (or its ester-forming derivative) respectively used as the main component.

Examples of the aromatic dicarboxylic acid mentioned above which may be used, include terephthalic acid, isophthalic acid, orthophthalic acid, 1,5-naphthalenedicarboxylic acid, 2,5-naphthalenedicarboxylic acid, 2,6-naphthalenedicarboxylic acid, 4,4'-biphenyldicarboxylic acid, 3,3'-biphenyldicarboxylic acid, 4,4'-diphenyl ether dicarboxylic acid, 4,4'-diphenylmethanedicarboxylic acid, 4,4'-diphenyl sulfone dicarboxylic acid, 4,4'-diphenylisopropylidenedicarboxylic acid, 1,2-bis(phenoxy)ethane-4,4'-dicarboxylic acid, 2,5-anthracenedicarboxylic acid, 2,6-anthracenedicarboxylic acid, 4,4'-p-terphenylenedicarboxylic acid, 2,5-pyridinedicarboxylic acid, etc., among which terephthalic acid is preferably used. These aromatic dicarboxylic acids may also be used as a mixture of two or more thereof. Further, one or more aliphatic dicarboxylic acids, such as adipic acid, azelaic acid, sebacic acid, dodecanedicarboxylic acid etc., or alicyclic dicarboxylic acids, such as cyclohexanedicrboxylic acid, etc., may be used together with the aromatic dicarboxylic acid so long as they are in a small amount.

Preferred examples of the diol component include aliphatic diols such as ethylene glycol, propylene glycol, butylene glycol, hexylene glycol, neopentyl glycol, 2-methyl-1,3-propanediol, diethylene glycol, triethylene glycol, etc.; alicyclic diols such as 1,4-cyclohexane dimethanol; and the mixtures thereof. Further, one or more long chain diols, i.e. polyethylene glycol, poly-1,3-propylene glycol, polytetramethylene glycol, and the like, of a molecular weight of 400-6,000 may also be copolymerized so long as they are in a small amount.

Examples of preferable polyesters (B) used in the present invention include polyethylene terephthalate, polybutylene terephthalate, polyhexamethylene terephthalate, polyethylene 2,6-naphthalate, polyethylene 1,2-bis(phenoxy)ethane-4,4'-dicarboxylate and copolymer obtained by condensation of terephthalic acid with ethylene glycol and 1,4-cyclohexane dimethanol (PET-G).

As examples of the polyamide (B), there may be mentioned polyamides of a high amino terminal content which include polylactams such as nylon 6, nylon 11, nylon 12, etc.; polyamides obtainable from dicarboxylic acids and diamines such as nylon 6,6, nylon 6,10, nylon 6,12, etc.; copolyamides such as nylon 6/6,6, nylon 6/6,12, nylon 6/6,6/6,10, nylon 6/6,6/6,12 and nylon 6/6,T (T standing for terephthalic acid component); and the mixtures thereof.

The chlorinated polyethylenes (C) used in the present invention are those which have a chlorine content of 20-45% by weight and a melt flow rate (180° C., 21.6 kg) of 1-130. Those which have a molecular weight of 1,000 or more, are preferable in the point of heat resistance and kneadability.

In the thermoplastic resin composition according to the present invention, 100 parts by weight of a resin mixture comprising 5-95% by weight of polyolefin (A) and 95-5% by weight of polyester and/or polyamide (B) must be further incorporated with 1-20 parts by weight of chlorinated polyethylene (C).

When the content of the component (A) is lower than 5% by weight and that of the component (B) is higher than 95% by weight, satisfactory processability, water resistance and chemical resistance cannot be obtained. When the content of the component (A) is higher than 95% by weight and that of the component (B) is lower than 5% by weight, favorable results cannot be obtained in heat resistance and rigidity.

With respect to the component (C), when its content is lower than 1 part by weight the compatibility and the dispersibility of the resin composition are insufficient, resulting in a large diameter of dispersed particles of several ten to several hundred μm and in unsatisfactory appearance and transparency. When the content of the component (C) is higher than 20 parts by weight the composition results in marked deterioration of heat resistance, impact resistance and rigidity.

Further, as occasion demands, other thermoplastic resins, e.g., saponified ethylene-vinyl acetate copolymer for improving gas barrier property and other additives, e.g., dyes, pigments, stabilizers, plasticizers, antistatic agents, ultraviolet absorbers, antioxidants, lubricants, fillers, adhesive tie layers, etc. may be added to the resin composition within limits not deleterious to the basic properties thereof.

As an application of the present invention, scraps of multi-layer films of two or more layers comprising a polyolefin layer, a nylon layer, a polyester layer, a saponified ethylene-vinyl acetate copolymer layer, an adhesive layer, etc., for example, multi-layer film with a structure of low density polyethylene layer/adhesive layer/nylon layer, low density polyethylene layer/adhesive layer/polyester layer, low density polyethylene layer/adhesive layer/nylon layer/adhesive layer/polyester layer, low density polyethylene layer/adhesive layer/saponified ethylene-vinyl acetate copolymer layer/nylon layer/adhesive layer/polyester layer, or low density polyethylene layer/adhesive layer/saponified ethylene-vinyl acetate copolymer layer/adhesive layer/polyester layer, are ground or granulated by means of a grinder or a granulator and then kneaded with chlorinated polyethylene to give reclaimed products having a uniform composition, good transparency and improved mechanical strength. The reclaimed product may further be used for one layer of a multi-layer film or as a material for other types of forming.

The thermoplastic resin composition according to the present invention can be easily made into molded articles, films, sheets etc. by processing methods conventionally used for usual thermoplastic resin compositions, for example, injection molding, extrusion, etc., to give products which have extremely well-balanced properties including processability, rigidity, heat resistance, impact resistance, oil resistance, chemical resistance and water resistance and which are excellent in appearance and transparency when processed into films, sheets, or the like. Further, by constituting the composition of the present invention, it has become possible to recycle the scrap of transparent multi-layer film constructed of polyolefin layer, polyester layer and polyamide layer.

DESCRIPTION OF PREFERRED EMBODIMENTS

The present invention will be described in detail below with reference to the Examples, which are merely for the sake of illustration and are not to be construed as limiting the scope of the invention.

In the Examples, predetermined amounts of components were sufficiently agitated and mixed in a super mixer, and the resulting mixture was melt-kneaded by use of a twin-screw extruder of 44 mm in diameter and L/D:40 at 240° C. and was extruded into strands and pelletized with a cutter.

In the Examples, the light transmission and haze were determined according to ASTM-D 1003 and the appearance was judged by visual observation, respectively with 0.05 mm T-die sheets used as the test pieces. The 0.05 mm sheets were prepared by use of a single-screw extruder of 50 mm in diameter provided with a T-die at cylinder temperature of 240° C., die temperature of 240° C. and roll-cooling temperature of 30° C. The tensile strength was determined according to ASTM-D 638 and the Izod impact strength according to ASTM-D 256, respectively with injection moldings used as the specimens. The specimens were prepared by use of an injection molding machine at cylinder temperature of 240° C. and mold-cooling temperature of 60° C. The blending compositions and the results of property determination are shown in Tables 1-5. In these Tables, the symbol ○ means "good" and x means "unacceptable".

EXAMPLES 1-4

The component (A) used was low density polyethylene (LDPE). The component (B) used was a copolyester (PET-G) obtained from terephthalic acid and two kinds of diol components, namely ethylene glycol and 1,4-cyclohexane dimethanol. The component (C) used was a chlorinated polyethylene (CPE) having a chlorine content of 31.5% by weight and a melt flow rate (180° C., 21.6 kg) of 120.

EXAMPLES 5-6

The component (A) used was LDPE, the component (B) used was polyethylene terephthalate (PET), and the component (C) used was a CPE having a chlorine content of 31.5% by weight and a melt flow rate (180° C., 21.6 kg) of 120.

EXAMPLES 7-9

The component (A) used was LDPE, the components (B) used were PET-G and nylon 6 (hereinafter abbreviated as Ny6), and the component (C) used was a CPE having a chlorine content of 31.5% by weight and a melt flow rate (180° C., 21.6 kg) of 120.

EXAMPLES 10-12

The component (A) used was LDPE, the component (B) used was Ny6, and the component (C) used was a CPE having a chlorine content of 31.5% by weight and a melt flow rate (180° C., 21.6 kg) of 120.

EXAMPLE 13

The scrap of a multi-layer film of a total thickness of 100 μm having a structure of LDPE layer/adhesive layer (polyolefinic)/Ny6 layer/adhesive layer (polyolefinic)/PET-G layer with a thickness ratio of 60/5/10/5/20 (μm) (said scrap having a weight ratio of polyolefin/(Ny6+PET-G) of 65/35) was ground, and a CPE having a chlorine content of 31.5% by weight and a melt flow rate (180° C., 21.6 kg) of 120 was incorporated thereinto as the component (C).

COMPARATIVE EXAMPLE 12

The same multi-layer film scrap as that used in Example 13 was used, but no component (C) was used.

TABLE 1

| | | Example | | | | | |
|---|---|---|---|---|---|---|---|
| | | 1 | 2 | 3 | 4 | 5 | 6 |
| Composition | LDPE (part by wt) | 94 | 70 | 70 | 6 | 70 | 30 |
| | PET-G (part by wt) | 6 | 30 | 30 | 94 | | |
| | PET (part by wt) | | | | | 30 | 70 |
| | CPE (part by wt) | 2 | 5 | 19 | 3 | 10 | 10 |
| T-die sheets property | Light transmission (%) | 91 | 92 | 94 | 92 | 94 | 94 |
| | Haze (%) | 8 | 6 | 5 | 7 | 5 | 5 |
| | Appearance | ○ | ○ | ○ | ○ | ○ | ○ |
| Injection moldings property | Notched izod impact strength (kgfcm/cm) | 21.5 | 28.3 | 35.1 | 30.1 | 32.5 | 30.2 |
| | Tensile strength (kgf/cm$^2$) | 650 | 680 | 730 | 700 | 720 | 730 |

TABLE 2

| | | Example | | | | | |
|---|---|---|---|---|---|---|---|
| | | 7 | 8 | 9 | 10 | 11 | 12 |
| Composition | LDPE (part by wt) | 94 | 70 | 5 | 94 | 70 | 6 |
| | PET-G (part by wt) | 3 | 20 | 90 | | | |
| | Ny6 (part by wt) | 3 | 10 | 5 | 6 | 30 | 94 |
| | CPE (part by wt) | 2 | 5 | 19 | 3 | 10 | 5 |
| T-die sheets property | Light transmission (%) | 91 | 92 | 94 | 94 | 93 | 92 |
| | Haze (%) | 5 | 8 | 7 | 4 | 5 | 5 |
| | Appearance | ○ | ○ | ○ | ○ | ○ | ○ |
| Injection moldings property | Notched izod impact strength (kgfcm/cm) | 23.5 | 27.5 | 33.1 | 35.1 | 34.8 | 32.2 |
| | Tensile strength (kgf/cm$^2$) | 660 | 680 | 730 | 720 | 740 | 750 |

COMPARATIVE EXAMPLES 1-3

As the component (A) was used LDPE, and as the component (B) was used PET-G.

COMPARATIVE EXAMPLES 4-5

The component (A) used was LDPE and the component (B) used was PET.

COMPARATIVE EXAMPLES 6-8

The component (A) used was LDPE and the components (B) used were PET-G and Ny6.

COMPARATIVE EXAMPLES 9-11

The component (A) used was LDPE and the component (B) used was Ny6.

TABLE 3

| | | Comparative Example | | | | |
|---|---|---|---|---|---|---|
| | | 1 | 2 | 3 | 4 | 5 |
| Composition | LDPE (part by wt) | 94 | 70 | 6 | 70 | 30 |
| | PET-G (part by wt) | 6 | 30 | 94 | | |
| | PET (part by wt) | | | | 30 | 70 |
| T-die sheets property | Light transmission (%) | 88 | 85 | 86 | 85 | 85 |
| | Haze (%) | 30 | 41 | 33 | 39 | 42 |
| | Appearance | X | X | X | X | X |
| Injection moldings property | Notched izod impact strength (kgfcm/cm) | 9.5 | 5.1 | 6.6 | 5.8 | 4.3 |
| | Tensile strength (kgf/cm$^2$) | 370 | 330 | 400 | 350 | 320 |

TABLE 4

| | | Comparative Example | | | | | |
|---|---|---|---|---|---|---|---|
| | | 6 | 7 | 8 | 9 | 10 | 11 |
| Composition | LDPE (part by wt) | 94 | 70 | 5 | 94 | 70 | 6 |
| | PET-G (part by wt) | 3 | 20 | 90 | | | |
| | Ny6 (part by wt) | 3 | 10 | 5 | 6 | 30 | 94 |
| T-die sheets | Light transmission (%) | 87 | 85 | 86 | 88 | 87 | 85 |
| | Haze (%) | 31 | 39 | 35 | 32 | 38 | 38 |

TABLE 4-continued

|  |  | Comparative Example | | | | | |
|---|---|---|---|---|---|---|---|
|  |  | 6 | 7 | 8 | 9 | 10 | 11 |
| property | Appearance | X | X | X | X | X | X |
| Injection moldings property | Notched izod impact strength (kgfcm/cm) | 7.5 | 6.1 | 6.3 | 5.5 | 4.1 | 3.5 |
| property | Tensile strength (kgf/cm$^2$) | 360 | 320 | 390 | 360 | 340 | 370 |

TABLE 5

|  |  | Example 13 | Comparative Example 12 |
|---|---|---|---|
| Composition | Scrap (part by wt) | 100 | 100 |
|  | CPE (part by wt) | 5 | 0 |
| T-die sheets property | Light transmission (%) | 93 | 85 |
|  | Haze (%) | 6 | 38 |
|  | Appearance | ○ | X |
| Injection moldings property | Notched izod impact strength (kgfcm/cm) | 30.2 | 5.8 |
|  | Tensile strength (kgf/cm$^2$) | 690 | 340 |

What is claimed is:

1. A thermoplastic resin composition comprising, 100 parts by weight of a resin mixture comprising (A) 5-95% by weight of polyolefin selected from the group consisting of homopolymers and copolymers of α-olefins, and copolymers of α-olefins with vinyl esters, said α-olefins being selected from the group consisting of ethylene, propylene, butene-1, pentene-1, hexene-1, 3-methylbutene-1 and octene-1, and (B) 95-5% by weight of polyester and/or polyamide, and (C) 1-20 parts by weight of chlorinated polyethylene incorporated into the resin mixture.

2. A composition according to claim 1 wherein the polyester is selected from the group consisting of polyethylene terephthalate, polybutylene terephthalate, polyhexamethylene terephthalate, polyethylene-2,6-naphthalate, polyethylene-1,2-bis(phenoxy)ethane-4,4'-dicarboxylate and copolymer obtained by condensation of terephthalic acid with ethylene glycol and 1,4-cyclohexane dimethanol.

3. A composition according to claim 1 wherein the polyamide is selected from the group consisting of polylactams, polyamides obtainable from dicarboxylic acids and diamines, and copolyamides.

4. A composition according to claim 1 wherein said chlorinated polyethylene has a chlorine content of 20-45%.

* * * * *